(12) United States Patent
Bansal

(10) Patent No.: US 8,317,906 B2
(45) Date of Patent: Nov. 27, 2012

(54) MEMBRANE CONTACTOR SYSTEMS FOR GAS-LIQUID CONTACT

(75) Inventor: Vishal Bansal, Overland Park, KS (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/295,740

(22) Filed: Nov. 14, 2011

(65) Prior Publication Data

US 2012/0058016 A1  Mar. 8, 2012

Related U.S. Application Data

(62) Division of application No. 12/182,230, filed on Jul. 30, 2008, now abandoned.

(51) Int. Cl.
*B01D 53/22* (2006.01)
*B01D 59/12* (2006.01)

(52) U.S. Cl. .......... 96/4; 96/290; 95/51; 95/211; 95/236

(58) Field of Classification Search .......... None
See application file for complete search history.

(56) References Cited

U.S. PATENT DOCUMENTS

| | | | |
|---|---|---|---|
| 3,953,566 A | | 4/1976 | Gore |
| 4,493,716 A | * | 1/1985 | Swick .............. 96/12 |
| 4,737,166 A | * | 4/1988 | Matson et al. .......... 95/44 |
| 5,059,374 A | * | 10/1991 | Krueger et al. .......... 264/156 |
| 5,281,254 A | * | 1/1994 | Birbara et al. .......... 95/44 |
| 5,480,455 A | | 1/1996 | Norvell |
| 5,749,941 A | * | 5/1998 | Jansen et al. .......... 95/44 |
| 5,753,009 A | * | 5/1998 | Sirkar et al. .......... 95/45 |
| 5,832,712 A | * | 11/1998 | Rønning et al. .......... 60/783 |
| 6,074,738 A | * | 6/2000 | von Fragstein et al. ... 428/315.9 |
| 6,196,708 B1 | * | 3/2001 | Rogers .......... 362/547 |
| 6,228,145 B1 | | 5/2001 | Falk-Pedersen et al. |
| 6,228,477 B1 | | 5/2001 | Klare et al. |
| 6,854,603 B2 | * | 2/2005 | Klare .......... 210/490 |
| 8,057,579 B2 | * | 11/2011 | Molaison .......... 95/215 |

(Continued)

FOREIGN PATENT DOCUMENTS

EP    0707179 A2    4/1996

(Continued)

OTHER PUBLICATIONS

GB Search Report for Patent Application No. GB0912658.2 dated Nov. 23, 2009.

(Continued)

*Primary Examiner* — Duane Smith
*Assistant Examiner* — Pankti Patel
(74) *Attorney, Agent, or Firm* — Cantor Colburn LLP

(57) ABSTRACT

A membrane contactor system for use in separating carbon dioxide from a gaseous stream in a continuous flow process comprising a housing defining a gas flow path and comprising a first outlet for the carbon dioxide and a second outlet for the purified gas; an expanded polytetrafluoroethylene microporous membrane positioned in the housing to allow the gaseous stream to flow across a side of the expanded polytetrafluoroethylene microporous membrane, the membrane having a plurality of interconnecting pores configured to allow the carbon dioxide to diffuse therethrough; an oleophobic enhancement coating disposed on the surfaces to form a coated membrane; and an amine based sorbent liquid disposed on a side of the expanded polytetrafluoroethylene microporous membrane opposite the gas, wherein the amine based sorbent liquid is configured to absorb the carbon dioxide from the gaseous stream.

10 Claims, 4 Drawing Sheets

U.S. PATENT DOCUMENTS

| | | | |
|---|---|---|---|
| 2002/0014154 A1* | 2/2002 | Witzko et al. | 95/178 |
| 2003/0192428 A1* | 10/2003 | Cheng et al. | 95/46 |
| 2004/0050250 A1* | 3/2004 | Pinnau et al. | 95/45 |
| 2007/0077407 A1* | 4/2007 | Olson et al. | 428/304.4 |
| 2008/0156191 A1* | 7/2008 | Parekh et al. | 95/211 |
| 2008/0173179 A1* | 7/2008 | Tandon et al. | 96/12 |
| 2008/0276803 A1* | 11/2008 | Molaison et al. | 95/178 |
| 2009/0026137 A1* | 1/2009 | Chen et al. | 210/637 |
| 2009/0127164 A9* | 5/2009 | Baudot et al. | 208/208 R |

FOREIGN PATENT DOCUMENTS

GB    2459749 A    11/2009

OTHER PUBLICATIONS

[No Name] Definition of "TEXTILE" Merriam Webster Dictionary, Merriam-Webster.com/dictionary/textile; (Aug. 30, 2011).
Bansal, Non-Final Office Action for U.S. 12/182,230 mailed on Sep. 15, 2011.

* cited by examiner

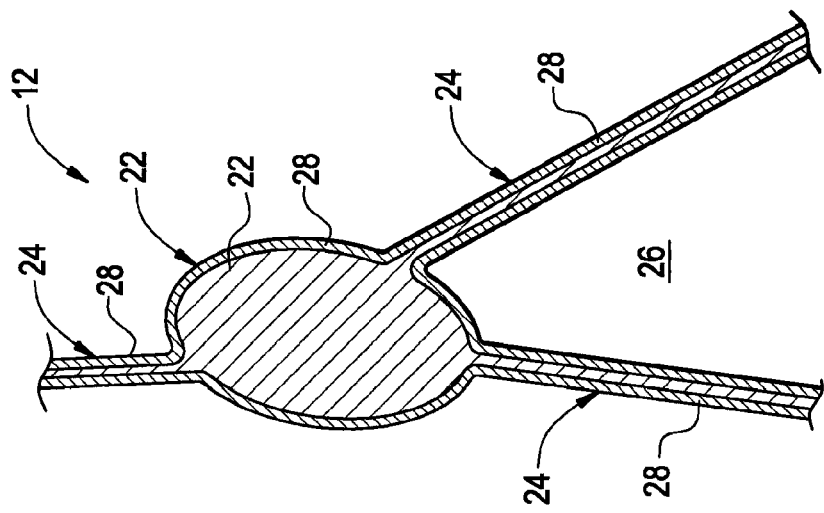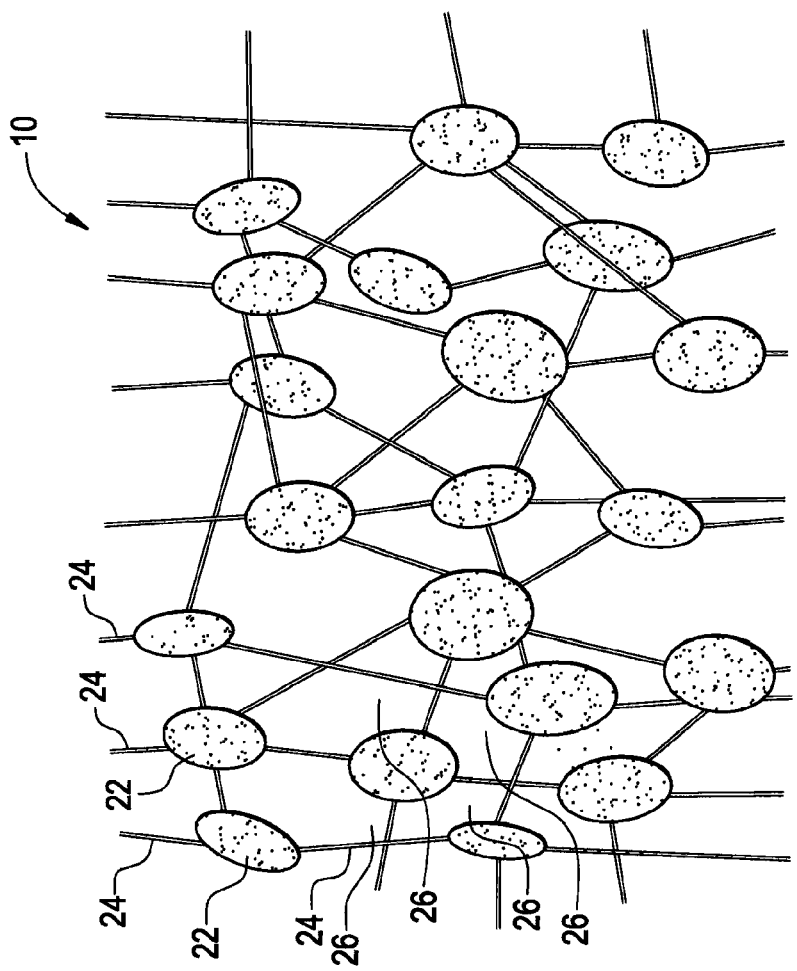

US 8,317,906 B2

MEMBRANE CONTACTOR SYSTEMS FOR GAS-LIQUID CONTACT

CROSS-REFERENCE TO RELATED APPLICATION

This application claims the benefit of and is a divisional of U.S. Non-Provisional application Ser. No. 12/182,230 filed Jul. 30, 2008, published as U.S. Publication. No.: 2010/0024651A1, which is incorporated herein by reference in its entirety.

BACKGROUND OF THE INVENTION

This disclosure relates generally to membrane contactor systems for gas-liquid contacting in process industry and, more specifically, to membrane contactors utilizing an oleophobically-treated expanded polytetrafluoroethylene membrane.

Systems for capturing and/or separating liquids and gases are desirable in a variety of applications. Exemplary gas-liquid contacting applications can include carbon dioxide separation, natural gas sweetening, degasification of oil, and the like. For example, the removal of carbon dioxide or other compounds from gases may be desirable or necessary for a number of reasons. If a gas is to be burned as fuel or emitted into the atmosphere as a waste flow, the removal of carbon dioxide from the gas is necessary in order to satisfy the carbon dioxide emission requirements which are set by air pollution control authorities. In natural gas, for instance, removing carbon dioxide ($CO_2$) from the gas can satisfy sales specifications or other process-dependent requirements.

Several systems exist for removing components, such as $CO_2$, from gases. Packed bed scrubbers, distillation columns, strippers, and the like, are all apparatuses used in such gas-liquid contacting applications for separation/removal of components. An example of a removal process using absorption includes removing $CO_2$ from flue gas by means of an aqueous amine solution. The gas to be separated is led into an absorption column where it comes into contact with amine solution, which absorbs the $CO_2$ molecules. The solvent can then be led to a desorption process where the liquid is heated, and the $CO_2$ molecules are removed from the amine solvent by means of a desorption column. The solvent is cooled and passed back to the absorption column, while the concentrated $CO_2$ is removed.

In an absorption column, the amount of contact time with the solvent can determine the degree of purification for the gas. Therefore, a certain liquid surface area per volume must exist for contact with the gas in order to purify the gas. Moreover, the amount of gas which has to be treated factors into the size of the apparatus. An absorption column, therefore, can require a large diameter and height in order to treat a desired amount of gas to the desired purification. Not only does this increase the cost of the system, but it can also impact the system's utility in applications where size and weight are a particularly expensive commodity, such as in offshore installations.

Gas absorption membranes are used as contacting devices between a gas and a liquid flow. These membrane contactors contain a porous membrane, which promotes contact between the liquid and the gas phase. The separation is caused by the presence of an absorption liquid (e.g., an amine solvent) on one side the membrane, which selectively removes certain components from the gas flow (e.g., $CO_2$) from the other side of the membrane. This technology is currently being used as a substitute for the apparatuses mentioned above in gas-liquid contacting applications.

The replacement of the conventional absorption columns with membrane contactors can lead to significant reductions both with regard to cost and weight for a separation system absorption unit. Membrane contactors can provide up to multiple orders of magnitude more surface area per volume than the conventional absorption contactors mentioned above, due to the porous nature of the membrane. Further, membrane contactors are free from problems like channeling and flooding that can occur in packed and tray columns.

Membrane contactors, however, can suffer from some drawbacks. Often times the membrane material, and the porosity thereof, is useful only for a limited range of liquids. Moreover, the pores of the membrane can block over time, thereby reducing the effectiveness of the contactor. Some membranes tend to absorb certain liquids and/or contaminating agents. The materials can clog up the pores of the membrane and prevent the desired gas from diffusing therethrough, or the membrane can no longer effectively resist penetration by the liquid phase.

SUMMARY OF THE INVENTION

Disclosed herein are membrane contactor systems, particularly those used for carbon dioxide separation, and methods for removing carbon dioxide from a flue gas stream in a gas turbine system. According to an embodiment, a membrane contactor system for use in separating carbon dioxide from a gaseous stream in a continuous flow process comprises a housing defining a gas flow path and comprising a first outlet for the carbon dioxide and a second outlet for the purified gas; an expanded polytetrafluoroethylene microporous membrane positioned in the housing to allow the gaseous stream to flow across a side of the expanded polytetrafluoroethylene microporous membrane, wherein the expanded polytetrafluoroethylene microporous membrane comprises a structure of nodes connected by fibrils in which surfaces of the structure of nodes and fibrils define a plurality of interconnecting pores extending through the expanded polytetrafluoroethylene microporous membrane, wherein the plurality of interconnecting pores are configured to allow the carbon dioxide to diffuse therethrough; an oleophobic enhancement coating disposed on the surfaces of the structure of nodes and fibrils to form a coated membrane and configured to provide oleophobicity to the coated membrane without blocking the plurality of interconnecting pores; and an amine based sorbent liquid disposed on a side of the expanded polytetrafluoroethylene microporous membrane opposite the gas, wherein the amine based sorbent liquid is configured to absorb the carbon dioxide from the gaseous stream.

In still another embodiment, a gas turbine engine comprises an exhaust treatment system configured to remove carbon dioxide from a combustion exhaust stream, wherein the system comprises: a housing defining a gas flow path and comprising a first outlet for the carbon dioxide and a second outlet for the purified exhaust; an expanded polytetrafluoroethylene microporous membrane positioned in the housing to allow the exhaust stream to flow across a side of the membrane, wherein the membrane comprises a structure of nodes connected by fibrils in which surfaces of the structure nodes and fibrils define a plurality of interconnecting pores extending through the membrane, wherein the pores are configured to allow the carbon dioxide to diffuse therethrough; an oleophobic enhancement coating disposed on the surfaces of structure of nodes and fibrils and configured to provide oleophobicity to the membrane without blocking the plurality of interconnecting pores; and an amine based sorbent liquid disposed on a side of the membrane opposite the exhaust stream, wherein the amine based sorbent liquid is configured to absorb the carbon dioxide from the exhaust stream to form the purified exhaust.

The above-described and other features are exemplified by the following Figures and detailed description.

BRIEF DESCRIPTION OF THE DRAWINGS

Referring now to the Figures, which are exemplary embodiments, and wherein the like elements are numbered alike:

FIG. 2 is an enlarged schematic illustration of a portion of the membrane illustrated in FIG. 1;

FIG. 3 is a greatly enlarged schematic sectional illustration of a portion of the membrane in FIG. 2, illustrating a coating disposed on the surfaces in the membrane;

DETAILED DESCRIPTION OF THE INVENTION

The membrane contactor systems described herein include an oleophobically-treated expanded polytetrafluoroethylene (PTFE) membrane. The oleophobic treatment on the expanded PTFE membrane can allow for the membrane contactor system to be effective in applications covering a wider range of liquids than current membrane contactors. The oleophobic treatment, moreover, can increase the operating life of the membrane in the contactor by reducing the amount of blockage of pores that can occur during use. The membrane contactor described herein can be disposed in any gas-liquid contacting application, such as, without limitation, carbon dioxide separation/removal, natural gas sweetening, oil degasification, and the like. In an exemplary embodiment, the membrane contactor system can replace current absorption units in a carbon dioxide ($CO_2$) separation process. Employing the membrane contactor system instead of current separation technologies (e.g., packed bed scrubbers) for carbon dioxide removal can reduce the installation and operation costs of the system; reduce the space requirements and weight of the system; and improve the environmental impact of the system by reducing the amount of liquid stream carry over by the gas phase.

Figure 1:
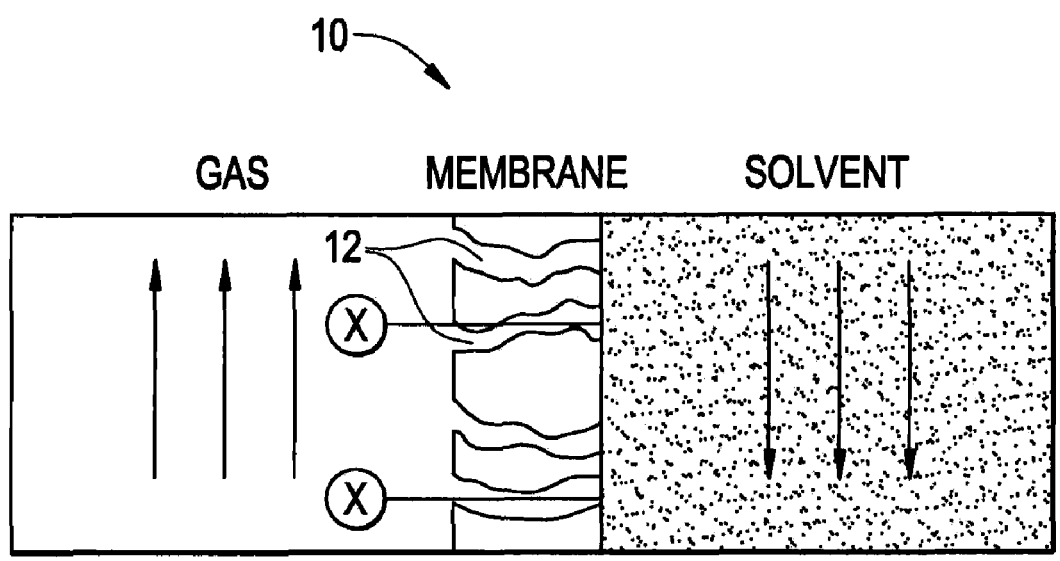
FIG. 1 is a schematic illustration of an embodiment of gas/liquid oleophobically-treated membrane contactor.

As mentioned, the membrane contactor system comprises a porous membrane and is configured to promote contact between a liquid and a gas phase. When the membrane is placed between the gas and the liquid (i.e., the solvent), the liquid will not be in direct contact with the gas, which is in motion. This division between the gas and liquid phases makes it possible to employ a high gas rate in the system without the liquid being carried along by the gas. FIG. 1 illustrates an exemplary embodiment of a membrane 10. The size of the pores 12 in the membrane 10 can be selected according to the following reasoning: the pores 12 are so large that the "X" gas molecules (e.g. $CO_2$) move (diffuse) rapidly through the pores 12 and into the solvent, and the pores 12 are so small that solvent does not penetrate into the pores 12 and through the membrane 10. The membrane of the system described herein is advantageously treated with an oleophobic enhancement material.

"Oleophobicity" of the membrane can be rated on a scale of 1 to 8 according to AATCC test 118-1992. This test evaluates the membrane's resistance to wetting. Eight standard oils, labeled #1 to #8, are used in the test. The #1 oil is mineral oil (surface tension: 31.5 dynes/cm @25 degrees Celsius (° C.)) and the #8 oil is heptane (surface tension: 14.8 dynes/cm @25° C.). Five drops of each rated oil are placed on the membrane. Failure occurs when wetting of the membrane by a selected oil occurs within 30 seconds. The oleophobic rating of the membrane corresponds to the last oil successfully tested. The higher the oleophobic rating, the better the oleophobicity. After treatment, the membrane 10 can have an increased oleophobicity. In an exemplary embodiment, the oleophobicity of the membrane 10 is at least 1, specifically at least 2, more specifically at least 4, even more specifically at least 6, and most specifically at least 8.

The membrane 10 is comprised of an expanded PTFE (ePTFE). As illustrated in FIG. 2, the ePTFE is porous, specifically microporous, with a three-dimensional matrix or lattice-type structure of nodes 22 interconnected by numerous fibrils 24. Surfaces of the nodes 22 and fibrils 24 define numerous interconnecting pores 26 that extend through the membrane 10 between opposite sides of the membrane. Expansion of the PTFE material to form the microporous structure is well known to those having skill in the art, and essentially involves stretching the PTFE at a certain rate and temperature as described, for example, in U.S. Pat. No. 3,953, 566. Exemplary ePTFE materials are available commercially from, for example, Tetratec #1305 (Tetratec, Philadelphia, Pa.) or Poreflon® WP-100, Sumitomo Electric Industries, Osaka, Japan.

ePTFE typically provides air permeability, while being hydrophobic. This property of the ePTFE material is useful in applications where restriction of water is desirable. The ePTFE material can be coated with an oleophobic material in such a way that provides oleophobic properties to the ePTFE without compromising the hydrophobicity or the permeability of the material. Turning now to FIG. 3, the oleophobic treatment can adhere a coating 28 to the nodes 22 and fibrils 24 that define the pores 26 in the membrane 10. The oleophobic coating 28 can also conform to the surfaces of at least most, specifically all, the nodes 22 and fibrils 24 that define the pore 26 in the membrane 10. Again, the coating 28 improves the oleophobicity of the membrane 10 by resisting contamination from absorption of contaminating materials. This permits the treated ePTFE membrane to be useful with a wider range of liquids and gases, because the oleophobic coated pores prevent the contaminating materials from absorbing in the membrane. As used herein, "contaminating materials/contaminants" is generally used to mean any material that is not the desired molecule to be absorbed in the membrane for the particular application, or any material that can cause blockage of the pores in the membrane.

The size of the pores of the oleophobically-treated ePTFE can contribute to determining the effective range of molecules that can be prevented or restricted from flow through the membrane 10. Some factors considered in choosing pore size are viscosity and pressure on the liquid side of the membrane. In addition, pore size can have an effect on the rate at which gas can migrate across the membrane. Exemplary average pore size can range from about 0.05 micrometers (µm) to about 1.5 µm, specifically from about 0.2 µm to about 1.0 µm, and more specifically from about 0.5 µm to about 0.8 µm. However, larger or smaller average pore sizes may be used.

The average pore size of the particular membrane 10 will depend upon the intended application for the membrane contactor system, and the range of fluids involved therewith.

Another factor in the flow of the fluid through the oleophobically-treated ePTFE membrane 10 is the porosity of the membrane, (i.e., the percentage of open space in the volume of the membrane, as determined by comparison of the density of the ePTFE with respect to the density of nonporous, non-expanded PTFE). Exemplary porosity of the membrane 10 can be in the range from about 20% or to about 95%. Again, depending upon the application of the membrane contactor system, the porosity of the membrane can range from about 70% to about 95%, specifically from about 80% to about 95%, and more specifically from about 85% to about 95%, for most gas-liquid contacting applications.

The dimensions (e.g., length, width, or diameter) of the membrane 10 can vary and will again depend on the use of the membrane contactor system. For example, a membrane contactor system used as an absorption unit for removal of $CO_2$ from a turbine exhaust gas can have dimensions based on, among other things, the size of the port through which the exhaust gas flows, the flow rate through the port, the average amount of $CO_2$ in the exhaust, the amount of $CO_2$ to be absorbed during the lifetime of the system, and the like. Depending upon the size of the intended application, the membrane contact system can comprise a single layer of oleophobically-treated ePTFE membrane, or multiple layers. In one embodiment, the membrane can be configured as a hollow tube or tubes. In such a configuration, liquid can be disposed on the outside of the tube(s) and the gas can be disposed inside. Conversely, the hollow tube membrane can be as effective when the liquid is disposed within the tube(s) and the gas is disposed outside.

The thickness of the membrane 10 can depend, for example, on the amount of absorption desired, the average pore size of the membrane 10, the expected or desired lifetime of the membrane contactor system, the average pore size of other possible membrane layers in the system, and the durability of the membrane 10. Generally, the thicker the membrane 10, the more restricted the flow of fluid and/or molecules through the membrane 10. Thus, for example, the thickness of a membrane in a $CO_2$ separation/removal process may be determined by a balance of a desired rate of mass transport of fluid (e.g., exhaust gas) across the membrane and a desired amount of filtration of $CO_2$. In some embodiments, useful, for example as absorption units, thicknesses of the membrane in the membrane contactor system can be in a range of about 0.5 μm to about 500 μm. In exemplary embodiments, the thickness of the membrane can range from about 4 μm to about 200 μm, specifically from about 10 μm to about 150 μm, and more specifically from about 25 μm to about 100 μm. However, larger and smaller thicknesses can be used.

In another embodiment, the membrane can be disposed on a substrate layer. The substrate layer can impart strength and durability to the membrane. In an exemplary embodiment, the substrate layer can be a textile material. A textile material can be a fabric, netting, and the like. In one embodiment, the membrane can be laminated to the substrate layer. The lamination of membrane to the substrate layer or layers can be by thermal means, adhesive means or the like. In this specific embodiment, the overall thickness of the system can be bigger due to the addition of the substrate.

The membrane 10 is treated using an oleophobic coating material, in one embodiment to increase the oleophobicity of the membrane. Exemplary oleophobic coating materials include fluorinated polymers, which as used herein includes homopolymers and copolymers having fluorohydrocarbon and/or perfluorohydrocarbon moieties. The fluoro- or perfluorohydrocarbon moieties can be incorporated into the polymer backbone, pendant from the polymer backbone, or a combination thereof. Accordingly, a variety of different types of polymers can be used, including, for example, polyolefins, polyacrylates, polymethacrylates, polyesters, polysulfones, polyethersulfones, polycarbonates, polyethers, polyamides, polyacrylamides, polysulfonamides, polysiloxanes, and polyurethanes.

The fluorinated polymers can be derived from polymerization of a variety of monomers or oligomers known to produce the desired backbone ands that include fluorinated or perfluorinated $C_{1-32}$ hydrocarbon moieties, in particular fluoro $(C_{1-32})$alkyl and/or perfluoro$(C_{1-32})$alkyl moieties. In one embodiment, perfluoro$(C_{1-16})$alkyl moieties are present, in particular, —$CF_3$, —$CF_2CF_3$, and —$CF_2CF_2CF_3$. In another embodiment, perfluoro$(C_{1-12})$alkylene moieties are present, in particular, —$CF_2$—, —$CF_2CF_2$—, and —$CF_2CF_2CF_2$—. Exemplary monomer or oligomer units can include, for example, fluoro$(C_{1-16})$alkyl acrylates, fluoro$(C_{1-16})$alkyl methacrylates, perfluoro$(C_{1-16})$alkyl acrylates, perfluoro $(C_{1-16})$alkyl methacrylates, fluorinated and perfluorinated $C_{1-12}$ olefins such as tetrafluoroethylene, fluoro$(C_{1-12})$alkyl maleic acid esters, perfluoro$(C_{1-12})$alkyl maleic acid esters, fluoro$(C_{1-12})$alkyl $(C_{6-12})$aryl urethane oligomers, fluoro $(C_{1-12})$alkyl allyl urethane oligomers, fluoro$(C_{1-12})$alkyl urethane acrylate oligomers, fluoro$(C_{1-12})$alkyl urethane acrylate oligomers, and the like. The fluorinated monomers or oligomers can optionally be copolymerized with additional non-fluorinated monomers or oligomers including, for example, unsaturated hydrocarbons (e.g., olefins), $(C_{1-12})$ alkyl acrylates, and $(C_{1-12})$alkyl methacrylates.

Specific exemplary classes of these oleophobic polymers include, without limitation, apolar perfluoroalkylpolyethers having —$CF_3$, —$CF_2CF_3$, and —$CF_2CF_2CF_3$ moieties (PFPE), mixtures of apolar (PFPE) with polar monofunctional PFPE, polar water-insoluble PFPE with phosphate, silane, or amide end groups, mixtures of apolar PFPE with fluorinated or perfluorinated $(C_{1-12})$alkyl methacrylate polymers or fluorinated or perfluorinated $(C_{1-12})$alkyl acrylate polymers, and copolymers comprising perfluoro$(C_{1-3})$alkylether units and fluorinated or perfluorinated $(C_{1-12})$alkyl methacrylate units or fluorinated or perfluorinated $(C_{1-12})$ alkyl acrylate units. The above-mentioned polymers can be crosslinked by, for example, UV radiation in aqueous form solution or emulsion. Mixtures of the fluorinated polymers can be used as well.

One specific form that the oleophobic polymers are commercially available is emulsions. Exemplary emulsions can include, without limitation, those based on copolymers of siloxanes and perfluoro$(C_{1-12})$alkyl-substituted acrylates or methacrylates, emulsions based on fluorinated or perfluorinated co- or terpolymers, one type of unit containing at least hexafluoropropene or perfluoroalkyl vinyl ether, emulsions based on perfluoro$(C_{1-12})$alkyl-substituted polyacrylates and methacrylates, and the like. These polymers and their preparation are well known to those with skill in the art. A specific oleophobic fluorinated polymer is a perfluoroalkyl acrylic copolymer and/or perfluoroalkyl methacrylic copolymer water-based dispersion of Zonyl® 8195, 7040, 8412, and/or 8300, available from Dupont of Wilmington, Del.

The microporous ePTFE membrane is rendered oleophobic by treating it with an oleophobic coating composition. The process of treating the membrane can comprise any suitable method for oleophobically coating an article, and are well known to those skilled in the art. Exemplary techniques can include applying the oleophobic coating composition in a liquid form, e.g., a melt, or solution, or latex dispersion of the material. Exemplary methods for applying the liquid oleophobic enhancement material can include, without limitation, dipping, painting, spraying, roller-coating, brushing, and the like, over the surface of the membrane. Regardless of the technique, the application can be carried out until internal surfaces of the microporous membrane structure are coated with the oleophobic coating composition, but not until the pores are filled as that could lessen the gas-liquid absorption property of the membrane. Thus, the presence of the oleophobic coating composition has little effect on the porosity; that is, the walls defining the voids in the microporous membrane have only a very thin coating of the oleophobic material (as illustrated in FIG. 3). Application of the oleophobic coating composition can be achieved by varying the concentration, solids content of the solution or dispersion, and/or by varying the application temperature, or pressure.

The use of an organic solvent can help to facilitate the distribution of the oleophobic fluorinated polymer throughout the microporous membrane. Typically, the microporous membrane is not initially oleophobic and may be oleophilic. Thus, use of an organic solvent can sometimes reduce difficulties in wetting and/or saturating the membrane structure with the oleophobic coating composition. A variety of organic solvents can be used. The term "organic solvent" is intended to generally refer to non-aqueous solvents and combinations of non-aqueous solvents, and, in particular, to solvents comprising organic compounds. As used herein, the oleophobic material is "dissolved in an organic solvent" if at least about 50 wt. % of the material is dissolved in the organic solvent. Exemplary organic solvents can include, without limitation, alkanes, ketones, esters, ethers, alcohols, and the like, as well as combinations of these solvents. For example, exemplary organic solvents can include heptane, ethyl acetate, butyl acetate, isoamyl acetate, dioctyl adipate, acetone, methyl ethyl ketone, methyl isobutyl ketone, isopropanol, diethyl ether, mineral spirits, petroleum distillate, and combinations thereof. The choice of organic solvent or solvents for use with the oleophobic material can be affected by a variety of factors including, without limitation, solubility of the oleophobic fluoropolymer, boiling point of the solvent, molecular weight of the solvent, polarity of the solvent or solvent combination, and the like.

During application to the membrane, the oleophobic coating composition can wet and saturate the membrane 10. The solvent can then be removed, for example, by air drying or heating. The oleophobic is disposed on the membrane 10 and can impart oleophobicity to the membrane contactor system. It is possible in some embodiments to achieve covalent coupling between the oleophobic coating and the membrane. In an optional embodiment, the oleophobically-treated ePTFE membrane can be "cured" by heating. This "curing" process can possibly increase the oleophobicity by allowing rearrangement of the fluoropolymer into a specific oleophobic orientation. The application of heat can permit the oleophobic fluoropolymer to flow around the nodes 22 and fibrils 24 to form the coating 28. The curing temperature can vary among the oleophobic fluoropolymers. Exemplary ranges can include from about 40° C. to about 140° C., specifically about 50° C. to about 130° C., and more specifically about 70° C. and about 125° C.

In one embodiment, the fluorinated polymer is in the form of a stabilized water-miscible dispersion of the polymer solids. In this embodiment, the oleophobic fluoropolymer solids can also contain relatively small amounts of acetone and ethylene glycol or other water-miscible solvents and surfactants that were used in the polymerization reaction when the fluorinated polymer solids were made. Optionally, the dispersion of oleophobic fluorinated polymer solids is stabilized with a stabilizing agent, such as, but not limited to, deionized and/or demineralized water. The stabilizing agent reduces the propensity of the oleophobic fluorinated polymer solids from settling out and agglomerating to a size which cannot enter a pore in the membrane to be coated. Although the coating composition may include other amounts of stabilizing agent, in some embodiments the coating composition forming coating layer includes an amount of stabilizing agent in the range of about 5 wt % to 50 wt %. For example, in some embodiments the coating composition includes an amount of stabilizing agent in the range of about 15 wt % to about 25 wt %.

The stabilized dispersion of oleophobic fluorinated polymer solids can be diluted in one or more suitable solvents to form the coating composition that will form coating layer. Although other solvents may be used, suitable solvents can include, but are not limited to, water, ethanol, isopropyl alcohol, acetone, methanol, n-propanol, n-butanol, N,N-dimethylformamide, methyl ethyl ketone and water soluble e-and p-series glycol ethers. Moreover, although the solvents can have other surface tensions, in some embodiments, the coating composition includes a solvent having a surface tension of less than about 31 dynes per centimeter. After coating, as described above, the coating composition is then consolidated, for example by heating the coated membrane such that the oleophobic fluorinated polymer solids flow and coalesce, and such that the stabilizing agents and solvents are removed. During the application of heat, the thermal mobility of the oleophobic fluoropolymer solids allows the solids to be mobile and flow around, engage, and adhere to surfaces of the membrane, and therefore coalesce to form the coating layer.

Irrespective of the solvent or carrier used, the coating compositions can include an amount of oleophobic fluoropolymer solids in the range of about 0.1 wt % to about 10 wt % based on a total weight of the coating composition. For example, in some embodiments, the coating composition includes oleophobic fluoropolymer solids in the range of about 0.5 wt % to about 1.5 wt %. When the coating composition includes other amounts of solvent, other than water, the coating composition that forms coating layer includes an amount of solvent, other than water, in the range of about 40 wt % to about 80 wt %. For example, in some embodiments the coating composition includes an amount of solvent, other than water, in the range of about 50 wt % to about 75 wt %.

The coating composition has a surface tension and a relative contact angle that enable the coating composition to wet pores in the membrane such that pores are coated with the oleophobic fluorinated polymer solids in the coating composition. However, in some embodiments where an organic solvent is used as described above, the membrane is wet with a solution containing a solvent before the coating composition is applied to membrane such that the coating composition will pass through membrane pores and "wet-out" surfaces of membrane.

The thickness of coating layer formed and the amount and type of fluorinated polymer solids in the coating layer can depend on several factors, including the affinity of the solids to adhere and conform to the surfaces of the membrane that define membrane pores, the final solids content within the coating composition, the coating process, and the intended use and desired durability during use.

It is not necessary that the coating composition completely encapsulate the entire surface of the membrane network, or be continuous to increase oleophobicity of the membrane. However, in one embodiment, at least 50%, specifically at least 75%, and more specifically at least 90% of the membrane surfaces are coated.

The oleophobically-treated ePTFE membrane can be advantageously employed as a membrane contactor in gas/liquid contacting applications. The membrane contactor system can be particularly useful as a as the absorption unit of a $CO_2$ removal system for a gas turbine. While the discussion below focuses on the use of the membrane contactor in a downstream application for gas turbines, it is to be understood that the membrane contactor described herein can be employed in any system employing liquid-gas contacting technology. The membrane contactor system can be particularly effective in processes where weight, size, cost, energy consumption, and environmental aspects are key concerns.

Figure 4:
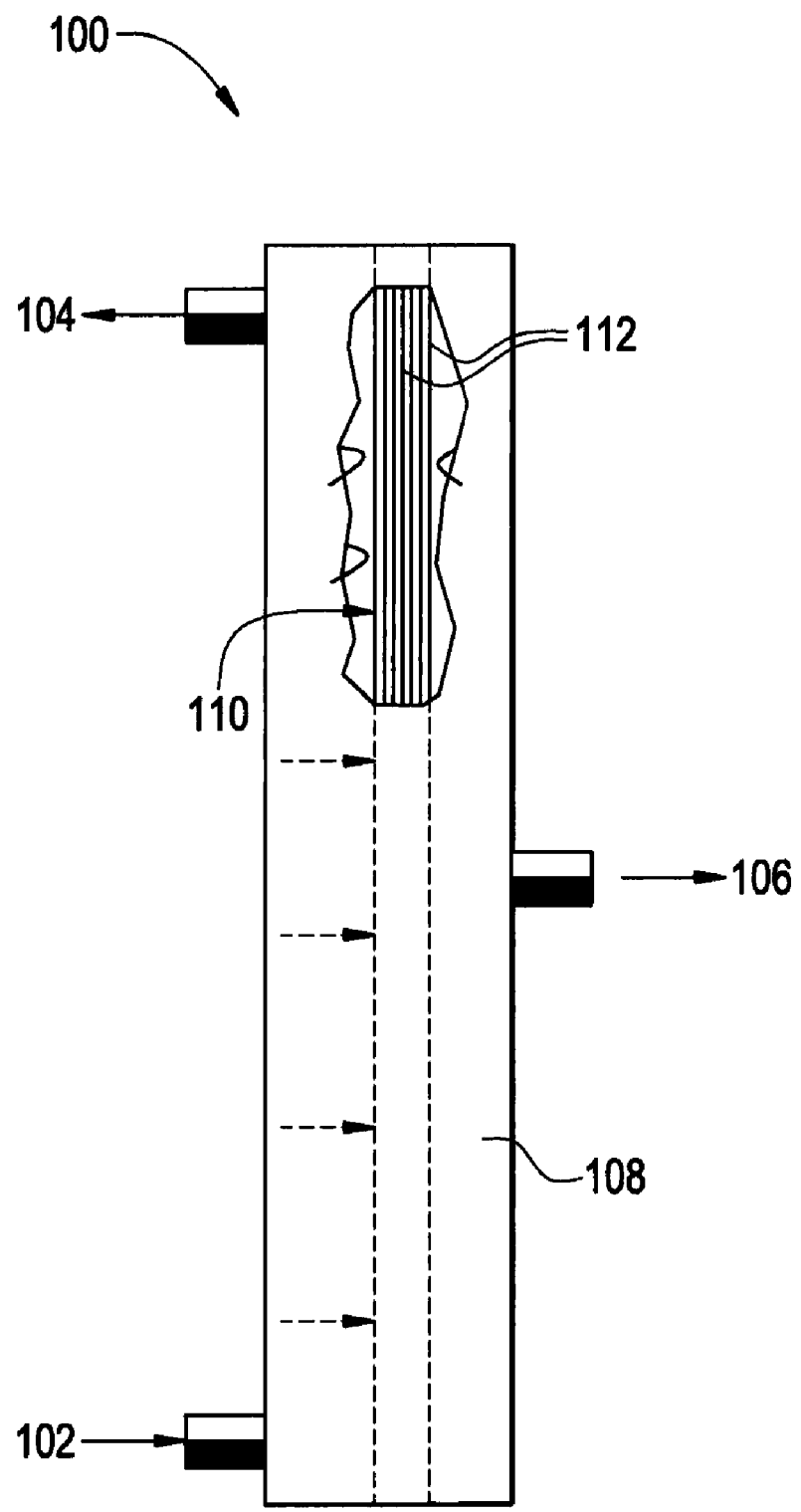
FIG. 4 is schematic illustration of an exemplary embodiment of a membrane contactor system for carbon dioxide removal.

FIG. 4 illustrates an exemplary embodiment of a membrane contactor system 100 that functions as a $CO_2$ absorption unit in a gas turbine engine system. The membrane contactor system 100 is configured to remove $CO_2$ or other compounds from combustion gases (e.g., natural gas). With recent trends in environmental regulation, it is becoming increasingly important to cheaply and effectively remove $CO_2$ emissions in hydrocarbon combustion processes. Exhaust gas is created after natural gas, or some other combustive fuel, are ignited in a gas turbine for energy. After being expanded through the turbine, the exhaust gas stream 102 is fed into the absorption unit 100. The exhaust gas stream 102 can be cooled first in order to help reduce the volume of the gas, and therefore, to reduce the size and weight of the membrane contactor system 100. Again, the membrane contactor system is configured to remove the $CO_2$ from the exhaust gas stream 102. The purified gas 104 (i.e., the $CO_2$-free exhaust) exits the top of the membrane contactor system 100, and can be vented to atmosphere or further treated or recycled for energy recovery. The $CO_2$-rich stream 106 can exit a lower portion of the membrane contactor system 100 and continue on for further treatment, such as desorption, compression, sequestration, and the like.

The membrane contactor system 100 is shown cutaway to reveal the individual membrane contactors 110 disposed in the system housing 108. The membrane contactor system 100 can contain a single membrane contactor or multiple membrane contactors, and will depend on the volume of the exhaust gas, the concentration of $CO_2$ in the gas, and the like. The oleophobically-treated ePTFE membranes in the $CO_2$ removal system can have a variety of shapes including, without limitation, sheets, hollow fibers, and the like. As shown in FIG. 4, the membranes contactors 110 comprise sheets of membranes 112.

The carbon dioxide removal system of the present disclosure can comprise the venting membrane contactor system 100 with an amine based absorption liquid. This system can utilize an amine-based sorbent and a membrane contactor at the appropriate partial pressure to absorb the $CO_2$ from the exhaust stream. The amine based sorbent is configured to absorb $CO_2$ from the gaseous stream while the membrane contactor system, comprised of a plurality of membranes, is configured to support the amine based sorbent and separate the amine based sorbent, the gaseous stream, and the $CO_2$.

The amine based sorbent is a liquid sorbent which is capable of absorbing $CO_2$. Exemplary characteristics of the amine based sorbent can include low volatility, nontoxicity, low viscosity, the ability to absorb $CO_2$ from low partial pressures (e.g., less than about 1 kilopascal (kPa)), and the like. Exemplary amine based sorbents can include amines, such as 2-amino-2-methyl-1,3-propanediol, 2-hydroxyethyl piperazine, methyldiethanolamine, monoethanolamine, tetraethylenepentamine, triethanolamine, polyethylene imine, and other like amine based sorbents. In an exemplary embodiment, the amine base sorbent can be a monoethanolamine (MEA).

In order to further enhance the amine based sorbent's $CO_2$ sorption rates, reduce its viscosity, and facilitate transport of the absorbed carbon dioxide, a solvent can be added to the amine based sorbent. Exemplary solvents can possess the same low volatility, low viscosity, and nontoxic properties of the amine based sorbent. Exemplary solvents can include, without limitation, alcohols, cyclic ketone, esters, ethers, and mixtures thereof, including dimethyl ether of polyethylene glycol, glycerol, methoxy triethylene, glycol diacetate, polyethylene glycol, propylene carbonate, 1,2-propylene glycol, and the like. The solvent used with a particular amine base sorbent for a given application can readily be determined by one of skill in the art. Exemplary factors for the selection of the solvent and the amine based sorbent can include chemical compatibility, solubility of the amine based sorbent in the solvent, absorption/desorption kinetics, nontoxicity, low viscosity, low volatility, and the like.

The chemical reaction for amine absorption is:

$$2(R-NH_2)+H_2O+CO_2 \rightarrow (R-NH_3)_2CO_3, \text{ where } R=C_2H_4OH$$

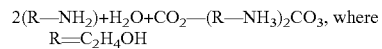

Figure 5:
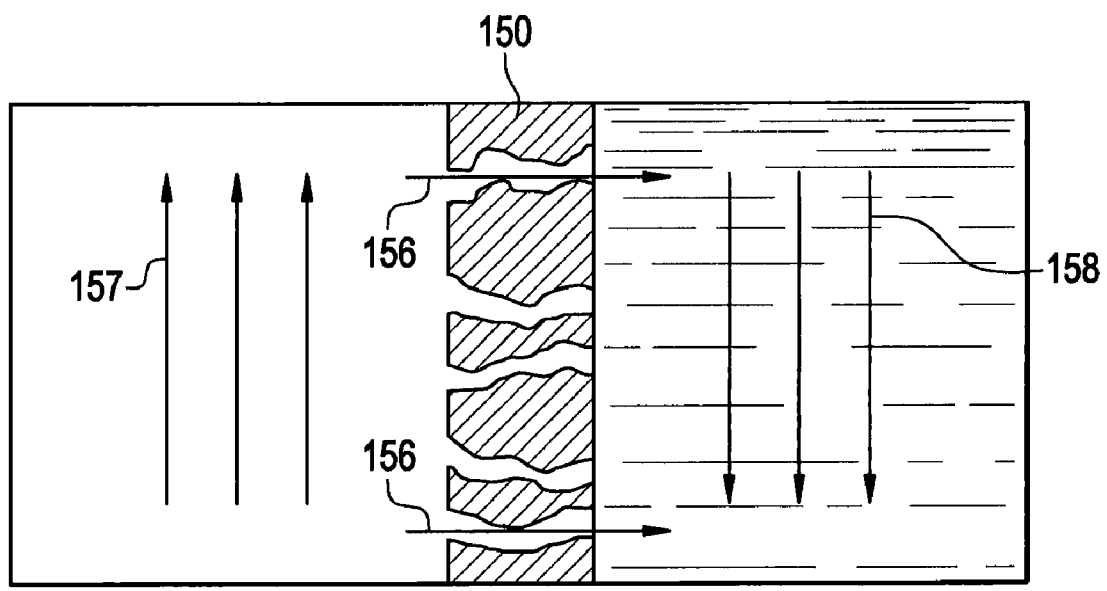
FIG. 5 is an enlarged schematic illustration of an oleophobically-treated membrane used in the membrane contactor system of FIG. 4.

The reaction is reversible and the equilibrium can be altered by altering the temperature. The $CO_2$ is absorbed by an absorption medium in a temperature range of about 20° C. to about 70° C. The oleophobically-treated ePTFE membranes are employed as contact devices between a gas and a liquid flow in the membrane contactor system 100. FIG. 5 illustrates an exemplary embodiment of an oleophobically-treated ePTFE membrane 150 in one of the membrane contactors. The separation is caused by the presence of the amine based sorbent liquid 158 on one side of the membrane 150, which selectively removes $CO_2$ 156 from the exhaust gas flow 157 on the other side of the membrane 150. The membrane 150 is intended to provide a contacting area which prevents mixing of the exhaust gas 157 and the amine based sorbent 158. The membrane 150, however, is advantageously permeable to the $CO_2$ 156, which is required to be removed. The selectivity in the separation process is derived from the amine based sorbent 158. A highly selective separation can be achieved through an appropriate choice of the amine based sorbent 158.

The removal of the exhaust gas $CO_2$ component is achieved by use of porous, oleophobic ePTFE membrane 150 in combination with a suitable amine based sorbent liquid 158. As a result of the membrane oleophobicity and small pore size, the exhaust gas 157 and amine based sorbent liquid 158 can be kept separate, and exhaust contaminant are prevented from blocking the pores by the oleophobic coating of the membrane. The amine based sorbent solution contacts the $CO_2$ in the gaseous exhaust stream within the membrane contactor. The membrane contactor system 100 promotes $CO_2$ removal via partial pressure gradients by utilizing the plurality of oleophobically-treated ePTFE membranes that contain or support the amine based sorbent. As a result of the porosity and oleophobic characteristics of the membranes, the contactor system allows direct liquid-gas contact, while preventing sorbent leakage, or blockage of the pores by contaminants in the gaseous exhaust stream. The membrane pore size is chosen dependent upon the operational characteristics of the amine based sorbent and the oleophobically-treated ePTFE membrane utilized. In an exemplary $CO_2$ removal system application, the membrane pore size can be less than about 0.1 μm, specifically less than about 0.05 μm.

The use of gas absorption membrane contactor systems comprising oleophobically-treated ePTFE membranes have several advantages over conventional contacting devices such as packed columns. The compactness of the equipment through the use of hollow fiber or sheet shaped membranes is typically smaller than packed column filter media, because the membranes have a much greater surface area per volume ($cm^2/cm^3$). The height of the absorption unit in the $CO_2$ removal system of a gas turbine will likewise be significantly reduced compared to current columns for the same reason. In some cases, the reduction can be as great as about ⅘ of the packed column height. Moreover, the oleophobically-treated ePTFE membranes do not have the same entrainment, flooding, channeling or foaming issues typically found in current packed bed columns Still further, the oleophobic coating on the membranes provide a membrane contactor system that can be employed in a wider variety of liquid compositions, because of the non-wetting nature of the pores. The coating also helps to increase the use life of the membrane contactors, because the oleophobic characteristics reduce the blockage of pores. All of these benefits lead to size, weight, cost, and environmental savings over current gas-liquid separation systems. The benefits of which can be particularly useful in off-shore applications, where space and weight are at a premium.

The terminology used herein is for the purpose of describing particular embodiments only and is not intended to be limiting of the invention. Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Unless otherwise defined, all terms (including technical and scientific terms) used herein have the same meaning as commonly understood by one of ordinary skill in the art to which the embodiments of the invention belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A membrane contactor system for use in separating carbon dioxide from a gaseous stream in a continuous flow process, the system comprising:
   a housing defining a gas flow path and comprising a first outlet for the carbon dioxide and a second outlet for a purified gas;
   an expanded polytetrafluoroethylene microporous membrane positioned in the housing to allow the gaseous stream to flow across a side of the expanded polytetrafluoroethylene microporous membrane, where the expanded polytetrafluoroethylene microporous membrane comprises a structure of nodes connected by fibrils in which surfaces of the structure of nodes and fibrils define a plurality of interconnecting pores extending through the expanded polytetrafluoroethylene microporous membrane, wherein the plurality of interconnecting pores are configured to allow the carbon dioxide to diffuse therethrough;
   an oleophobic enhancement coating disposed on the surfaces of the structure of nodes and fibrils to form a coated membrane and configured to provide oleophobicity to the coated membrane without blocking the plurality of interconnecting pores; and
   an amine based sorbent liquid disposed on a side of the expanded polytetrafluoroethylene microporous membrane opposite the gaseous stream, wherein the amine based sorbent liquid is configured to absorb the carbon dioxide from the gaseous stream.

2. The membrane contactor system of claim 1, wherein the coated membrane has an oleophobic rating of at least 4.

3. The membrane contactor system of claim 1, wherein the coated membrane has an oleophobic rating of at least 6.

4. The membrane contactor system of claim 1, wherein the coated membrane has an oleophobic rating of at least 8.

5. The membrane contactor system of claim 1, wherein the oleophobic coating comprises a polymer comprising fluorinated C1-32 hydrocarbon moieties.

6. The membrane contactor system of claim 5, wherein the polymer comprises units derived from polymerization of fluoro(C1-16)alkyl acrylates, fluoro(C1-16)alkyl methacrylates, perfluoro(C1-16)alkyl acrylates, perfluoro(C1-16)alkyl methacrylates, fluorinated and perfluorinated C1-12 olefins, fluoro(C1-12)alkyl maleic acid esters, perfluoro(C1-12)alkyl maleic acid esters, fluoro(C1-12)alkyl (C6-12)aryl urethane oligomers, fluoro(C1-12)alkyl allyl urethane oligomers, fluoro(C1-12)alkyl urethane acrylate oligomers, fluoro(C1-12)alkyl urethane acrylate oligomers, or a combination comprising at least one of the foregoing.

7. The membrane contactor system of claim 1, wherein the amine based sorbent liquid comprises 2-amino-2-methyl-1,3-propanediol, 2-hydroxyethyl piperazine, methyldiethanolamine, monoethanolamine, tetraethylenepentamine, triethanolamine, polyethylene imine, or a combination comprising at least one of the foregoing.

8. The membrane contactor system of claim 7, wherein the amine based sorbent liquid further comprises a solvent, wherein the solvent comprises alcohol, cyclic ketone, ester, ether, glycerol, methoxy triethylene, glycol diacetate, polyethylene glycol, propylene carbonate, 1,2-propylene glycol, or a combination comprising at least one of the foregoing.

9. A gas turbine engine comprising:
   an exhaust treatment system configured to remove carbon dioxide from a combustion exhaust stream, wherein the system comprises:
   a housing defining a gas flow path and comprising a first outlet for the carbon dioxide and a second outlet for a purified exhaust;
   an expanded polytetrafluoroethylene microporous membrane positioned in the housing to allow the exhaust stream to flow across a side of the membrane, wherein the membrane comprises a structure of nodes connected by fibrils in which surfaces of the structure of nodes and fibrils define a plurality of interconnecting pores extending through the membrane, wherein the pores are configured to allow the carbon dioxide to diffuse therethrough;
   an oleophobic enhancement coating disposed on surfaces of the structure of nodes and fibrils and configured to provide oleophobicity to the membrane without blocking the plurality of interconnecting pores; and
   an amine based sorbent liquid disposed on a side of the membrane opposite the exhaust stream, wherein the amine based sorbent liquid is configured to absorb the carbon dioxide from the exhaust stream to form the purified exhaust.

10. The membrane contactor system of claim 1, further comprising a solvent added to the amine based sorbent liquid, wherein the solvent is configured to enhance the carbon dioxide sorption rate of the amine based sorbent.

* * * * *